United States Patent
Puehringer et al.

(10) Patent No.: US 11,988,259 B2
(45) Date of Patent: May 21, 2024

(54) FRICTION DISC

(71) Applicant: Miba Frictec GmbH, Laakirchen (AT)

(72) Inventors: David Puehringer, Laakirchen (AT); Stefan Rothkegel, Steinhaus bei Wels (AT)

(73) Assignee: Miba Frictec GmbH, Laakirchen (AT)

( * ) Notice: Subject to any disclaimer, the term of this patent is extended or adjusted under 35 U.S.C. 154(b) by 13 days.

(21) Appl. No.: 16/856,415

(22) Filed: Apr. 23, 2020

(65) Prior Publication Data
US 2020/0370612 A1 Nov. 26, 2020

(30) Foreign Application Priority Data
May 24, 2019 (DE) .................. 20 2019 102 932.3

(51) Int. Cl.
| | | |
|---|---|---|
| *F16D 13/64* | (2006.01) | |
| *F16D 65/12* | (2006.01) | |
| *F16D 69/00* | (2006.01) | |
| *F16H 48/22* | (2006.01) | |
| *F16D 65/02* | (2006.01) | |

(52) U.S. Cl.
CPC ......... *F16D 65/127* (2013.01); *F16D 13/648* (2013.01); *F16D 69/00* (2013.01); *F16H 48/22* (2013.01); *F16D 2065/1324* (2013.01); *F16D 2069/004* (2013.01); *F16D 2069/009* (2013.01)

(58) Field of Classification Search
CPC ........ F16D 13/64–74; F16D 69/00–2069/004; F16D 13/00–76
See application file for complete search history.

(56) References Cited

U.S. PATENT DOCUMENTS

| | | | | |
|---|---|---|---|---|
| 2,850,118 A | * | 9/1958 | Byers ...................... | F16D 69/02 192/70.14 |
| 2,947,388 A | * | 8/1960 | Culbertson ........... | F16D 69/027 188/218 XL |
| 2,987,143 A | * | 6/1961 | Fuchs ................... | F16D 65/127 188/218 R |
| 3,472,348 A | | 10/1969 | Hilpert | |
| 3,757,907 A | | 9/1973 | Crossman et al. | |
| 5,358,086 A | * | 10/1994 | Muller ................... | F16D 13/64 192/70.14 |

(Continued)

FOREIGN PATENT DOCUMENTS

| | | |
|---|---|---|
| AT | 519131 A4 | 4/2018 |
| CN | 1849464 A | 10/2006 |

(Continued)

*Primary Examiner* — Ernesto A Suarez
*Assistant Examiner* — Lillian T Nguyen
(74) *Attorney, Agent, or Firm* — Collard & Roe, P.C.

(57) ABSTRACT

A friction disc has a flat carrier ring which includes a first surface and a second surface, wherein a first annular friction lining is arranged on the first surface, the first annular friction lining including a geometry that deviates from the circular ring shape, wherein the carrier ring also includes the geometry of the first friction lining, each as viewed in the axial direction, and/or the first annular friction lining including at least one opening in the axial direction, which extends in the axial direction also through the carrier ring, wherein the opening is formed to start at the inner circumference or at the outer circumference of the carrier ring.

7 Claims, 3 Drawing Sheets

(56) References Cited

U.S. PATENT DOCUMENTS

| | | | | |
|---|---|---|---|---|
| 5,454,454 A | * | 10/1995 | Easton | F16D 13/648 |
| | | | | 188/218 XL |
| 5,975,270 A | * | 11/1999 | Tokune | F16D 13/64 |
| | | | | 192/107 M |
| 7,216,750 B2 | | 5/2007 | Sudau et al. | |
| 7,455,162 B2 | | 11/2008 | Epple et al. | |
| 2006/0163023 A1 | * | 7/2006 | Sudau | F16D 13/72 |
| | | | | 192/113.3 |
| 2008/0190727 A1 | * | 8/2008 | Kobayashi | F16D 13/74 |
| | | | | 192/107 R |
| 2008/0302625 A1 | * | 12/2008 | Takayanagi | F16D 25/123 |
| | | | | 192/107 R |
| 2016/0146266 A1 | * | 5/2016 | Kremer | F16D 13/648 |
| | | | | 192/70.11 |
| 2017/0254368 A1 | | 9/2017 | Hartner et al. | |
| 2019/0195293 A1 | | 6/2019 | Foege et al. | |

FOREIGN PATENT DOCUMENTS

| | | | |
|---|---|---|---|
| CN | 105370746 A | 3/2016 | |
| DE | 2 225 981 A | 2/1973 | |
| DE | 84 02 501 U1 | 5/1984 | |
| DE | 4322231 A1 * | 1/1995 | F16D 13/64 |
| DE | 44 07 727 A1 | 9/1995 | |
| DE | 102 34 822 A1 | 2/2004 | |
| DE | 102009032180 A1 | 1/2011 | |
| DE | 10 2014 208 732 A1 | 11/2015 | |
| DE | 10 2016 205 706 A1 | 11/2016 | |
| DE | 20 2018 002 101 U1 | 5/2018 | |
| DE | 102017124330 A1 * | 4/2019 | F16D 13/648 |
| FR | 1 268 697 A | 8/1961 | |
| GB | 2087999 A * | 6/1982 | F16D 55/14 |
| GB | 2 332 487 A | 6/1999 | |
| WO | 2019204844 A1 | 10/2019 | |

\* cited by examiner

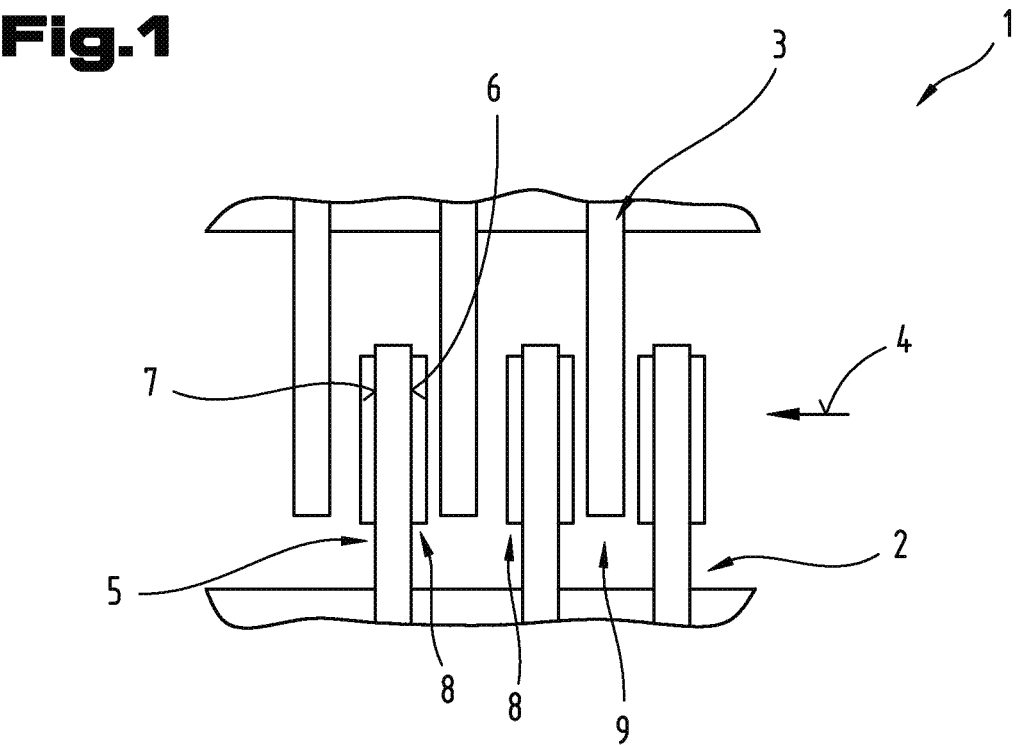
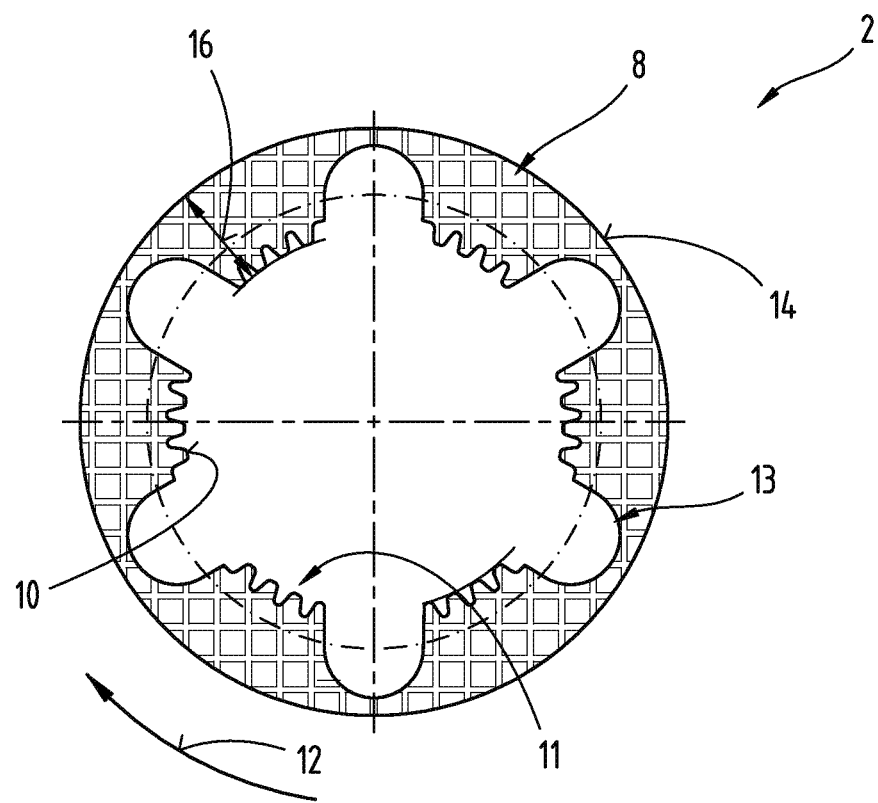

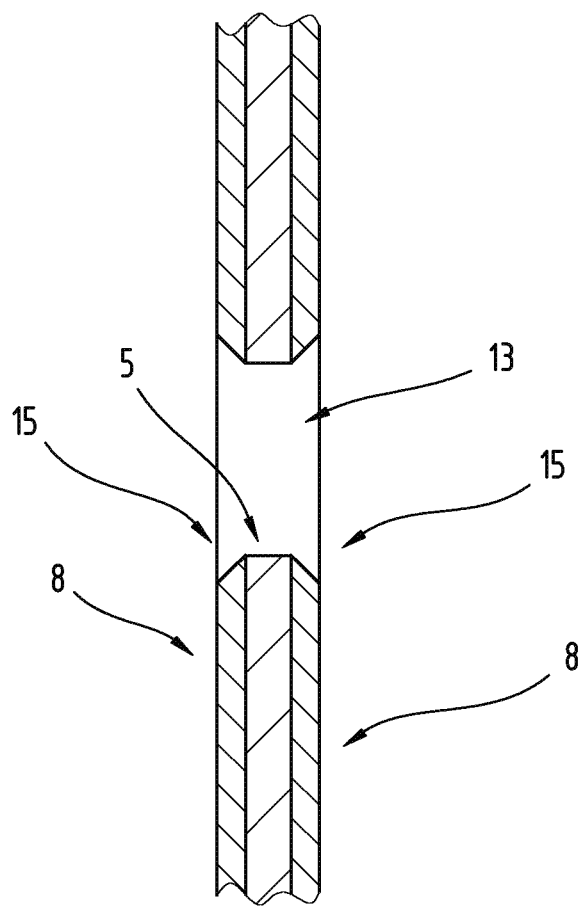

FRICTION DISC

CROSS REFERENCE TO RELATED APPLICATIONS

Applicant claims priority under 35 U.S.C. § 119 of German Application No. 202019102932.3 filed May 24, 2019, the disclosure of which is incorporated by reference.

BACKGROUND OF THE INVENTION

1. Field of the Invention

The invention relates to a friction disc having a flat carrier ring, which comprises a first surface and a second surface, wherein a first annular friction lining is arranged on the first surface.

2. Description of the Related Art

Friction discs for disc friction systems are per se known from the prior art. These can be designed with or without a friction lining. Furthermore, they can be designed as outer or inner disc. The friction discs are located on disc carriers and are brought into frictional contact with one another by means of an actuating device as required.

As regards the friction linings, often, annular scatter-sintered friction linings or composite friction linings are often used. Composite friction linings can also be designed to be segmented.

Moreover, it is known to give the friction linings a surface structure in the form of a groove so as to improve cooling of the friction linings with oil.

DE 20 2018 002 101 U1 describes a friction plate comprising a flat carrier ring having a first surface and a second surface, wherein an annular friction lining is arranged on the first surface, and at least one opening is formed in the first friction lining in the axial direction, which extends in the axial direction also through the carrier ring, wherein the opening is formed at a distance from an inner circumference and at a distance from an outer circumference of the carrier ring.

SUMMARY OF THE INVENTION

The present invention is based on the object of providing a friction disc that is reduced in weight.

This object of the invention is achieved in the initially mentioned friction disc in that the first annular friction lining comprises a geometry deviating from the circular ring shape, wherein the carrier ring also comprises the geometry of the first friction lining, each as viewed in a plan view, and/or that at least one opening is formed in the first friction lining in the axial direction, which extends in the axial direction also through the carrier ring, wherein the opening is formed to start at an inner circumference or at an outer circumference of the carrier ring.

The advantage of this is that despite the weight reduction of the friction disc, the geometry deviating from the circular ring shape allows for use of a relatively large-scale carrier ring. This, in turn, has advantages regarding the stability of the friction disc and to the momentum that can be transmitted thereby. These effects can also be achieved to a reduced extent with the other embodiment variants of the friction disc, wherein improved cooling can also be achieved here by means of an improved coolant distribution. This also allows for the coolant to flow better out of the area of the friction disc surfaces, which can reduce drag torques.

According to an embodiment variant of the friction disc, it can be provided for that a friction lining is not only arranged on one side of the carrier ring, but that a second friction lining is arranged also on the second surface of the carrier ring, said second friction lining having the geometry of the carrier ring and of the first annular friction lining deviating from the circular ring shape and/or comprising at least one opening in the axial direction, which extends in the axial direction also through the carrier ring and the first friction lining, wherein the opening is formed to start at an inner circumference or at an outer circumference of the carrier ring. Hence, the effects described above could be realized also for friction discs acting in two directions.

According to a further embodiment variants, the first friction lining and/or the second friction lining is/are a scatter-sintered friction lining, since these have a lower compressibility. The at least one opening can thus be designed to be larger without a loss in performance.

According to another embodiment variant of the friction disc, it can also be provided for that the opening at least in some areas is designed to be semicircular or circle-segment-shaped. The flow behavior of the coolant in the region of the friction disc can be positively affected regarding the friction behavior of the friction disc by means of the at least partially round shape of the opening.

For further improvement of the aforementioned effects, according to a further embodiment variant of the friction disc, it can be provided for that several openings extending through the friction disc in the axial direction are formed.

In the course of tests that were carried out, it was found that the aforementioned effects are particularly pronounced if the at least one opening in the first friction lining extends across a radial width of the first friction lining, which amounts to between 50% and 90% of the total width of the first friction lining in the radial direction.

For preventing damage to the friction disc in the region of the openings, according to an embodiment variant, it can be provided for that the edges of the first and/or second friction lining are formed to be beveled where these join the at least one opening. Moreover, hence, the flow behavior of a coolant through the opening can be improved.

A better adaptability of the tribological properties of the friction disc to those of solid rings is possible if the several openings in the friction disc are designed to end at different radial heights according to another embodiment variant.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 shows a cutout from a disc pack in a side view;

FIG. 2 shows a first embodiment variant of the friction disc;

FIG. 5 shows a detail from an embodiment variant of a friction disc in a sectional side view.

DETAILED DESCRIPTION OF PREFERRED EMBODIMENTS

Figure 3:
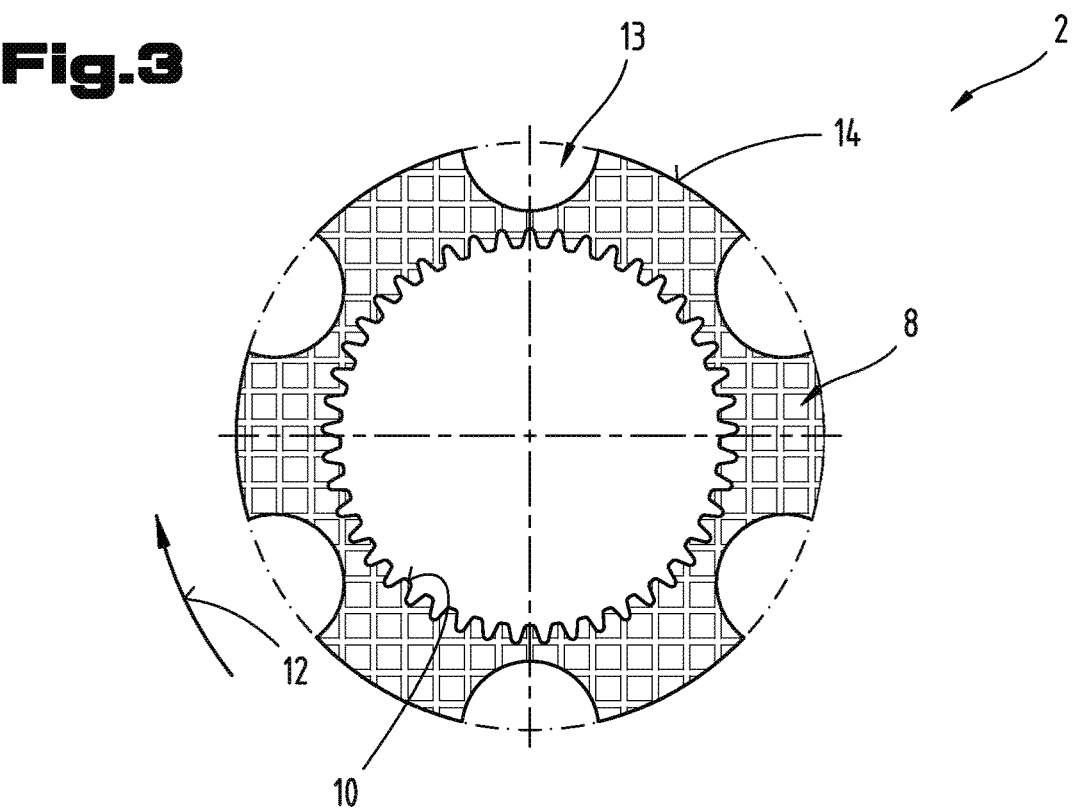
FIG. 3 shows a second embodiment variant of the friction disc.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a cutout from a disc pack 1. The disc pack 1 comprises several inner discs 2 and several outer discs 3, which can also be referred to as friction discs. The inner discs 2 are arranged in an axial direction 4 alternating with the outer discs 3. Via a corresponding confirmation mechanism, the inner discs 2 are adjustable relative to the outer discs 3 in the axial direction 4, such that a frictional engagement is established between the inner discs 2 and the outer discs 3. The inner discs 2 comprise an at least approximately flat carrier ring 5 with a first surface 6 and a second surface 7 opposite thereto the axial direction 4. A friction lining 8 is arranged on the first and/or on the second surface 6, 7. Thus, the inner discs 2 are so-called lining discs.

The outer discs 3 also comprise an at least approximately angular disc body 9, which is, however, free of friction linings 8 in the shown embodiment variant. Thus, the outer discs 3 are the so-called counter discs, which can be brought into frictional engagement with the friction linings 8 of the inner discs 2. However, it is also possible that the friction linings 8 are arranged on the outer discs 3, in particular if no friction linings 8 are arranged on the inner discs 2.

Preferably, the carrier ring 5 of the inner disc 2 and/or the disc body 9 of the outer disc 3 consists of and/or comprises a steel. However, these can also consist of another suitable, in particular metallic, material, for example of a sintered material.

This general structure of a disc pack 1 is known from the prior art. As regards further details, reference is thus made to the relevant prior art.

The disc pack 1 is part of a disc friction system, in particular a disc clutch, a brake, a holding device, a differential lock, etc.

FIG. 2 shows a first embodiment variant of a friction disc, as is and/or can be inserted into the disc pack 1 according to FIG. 1. In particular, an inner disc 2 is shown. However, the friction disc can also be an outer disc 3 (FIG. 1).

The friction disc according to the invention is in particular provided for so-called wet-running operation.

The friction disc can comprise at least one driver element 11, for example in the form of an internal toothing, on a radially inner end face 10 (on the inner circumference).

At this point, it should be mentioned that the outer discs 3 can also comprise at least one driver element on a radially outer end face. Should the friction disc according to FIG. 2 thus be formed as an outer disc 3, the at least one driver element is arranged on the radially outer end face of the friction disc.

Via the driver elements 11, a connection preventing rotation relative to another component of the disc friction system can be established, for example of a shaft in case of the inner discs 2 or of the housing of the disc friction system in case of the outer discs 3, as is per se known.

It is also possible that the inner discs 2 or the outer discs 3 are formed as so-called floating discs, i.e. do not have such driver elements 11.

The carrier ring 5 (FIG. 1) of the friction disc is formed to be closed in a circumferential direction 12.

At this point, it should be noted that in case of the friction disc being an outer disc 3 (FIG. 1), the following statements regarding the carrier ring 5 also can be applied to the disc body 9 of the outer disc 3, if it is formed according to the invention.

Preferably, the carrier ring 5 is formed as a single piece. However, it is also possible that the carrier ring 5 is assembled from several segments connected to one another.

As already stated, a first friction lining 8 is arranged on the first surface 6 of the carrier ring 5 (FIG. 1) and connected thereto. As can be seen from FIG. 2, the first friction lining 8 is preferably arranged on the entire first surface 6 of the carrier ring 5. Moreover, the first friction lining 8 preferably extends continuously in the circumferential direction 12; i.e. is preferably also formed annularly. Thus, preferably one first friction lining 8 only is arranged on the first surface 6 of the carrier ring 5.

In the preferred embodiment variant, the first friction lining 8 is a scatter-sintered friction lining. The scatter-sintering technology itself is known from the prior art, such that reference is made thereto with respect to further details of this technology. At this point, it should just be noted that in this regard, a sintering powder suitable for the friction disc is sprinkled onto a prepared carrier ring 5 and sintered onto the carrier ring 5. This lining is then compacted and, at this, preferably grooves are pressed in to cool the friction disc. Subsequently, the lining is subjected to a second sintering. Optionally, subsequent treatment, e.g. calibration of the friction plate, deburring, etc., takes place.

The materials known from the prior art can be used as sintering powders for scatter-sintered linings.

According to an embodiment variant of the friction disc, alternatively or additionally to the first friction lining 8, a second friction lining 8 (FIG. 1) can be arranged on the second surface 7 of the carrier ring 5 (FIG. 1). This second friction lining 8, according to a further embodiment variant of the friction disc, preferably is a scatter-sintered lining. The statements above regarding the first friction lining 5 can thus also be applied to the second friction lining 8.

As can be seen from FIG. 2, at least one opening 13 is provided and/or formed in the friction lining 8 and the carrier ring 5 (FIG. 1), said opening extending continuously through the friction lining 8 and the carrier ring 5 in the axial direction 4 (FIG. 1). The opening 13 through the friction lining 8 is formed to be flush to the opening 13 of the carrier ring 5. Moreover, the opening 13 is formed to start at the radially inner end face 10 and to extend outwardly in the radial direction, in the direction towards a radially outer end face 14 (i.e. in the direction towards the outer circumference). The opening 13 ends at a distance to the radially outer end face 14.

FIG. 3 shows an embodiment variant of the friction disc in the form of an inner disc 2, for which the situation is reversed. This friction disc again comprises the at least one opening 13, which continuously extends through the friction lining 8 and the carrier ring 5 (FIG. 1) in the axial direction 4 (FIG. 1). The opening 13 through the friction lining 8 is formed to be flush to the opening 13 of the carrier ring 5. However, the opening 13 does not start at the radially inner end face 10, but starts at the radially outer end face 14 and extends inwardly in the radial direction, in the direction towards a radially inner end face 10. The opening 13 ends at a distance to the radially inner end face 10.

If the second friction lining 8 described above is also arranged on the carrier ring 5, at least one opening 13 is preferably arranged and/or formed therein as well. The statements regarding the opening 13 in the first friction lining 8 analogously apply also to this opening 13 in the second friction lining 8. This opening 13 is formed to be flush with the opening 13 in the first friction lining and in the carrier ring 5.

Although in the embodiment variants described above of the friction disc only one opening 13 is formed in the first friction lining 8 and in the carrier ring 5 and/or only one opening 13 is formed in the second friction lining 8 and in the carrier ring 5, according to a further embodiment variant of the friction lining, it is preferred that several openings 13 are formed in the first friction lining 8 and in the carrier ring 5 and/or that several openings 13 are formed in the second friction lining 8 and in the carrier ring 5, as can be seen from FIGS. 2 and 3. In this regard, hence, several openings 13 extending through the friction disc in the axial direction 4 are formed. In particular, the number of openings 13 can be selected from a range of 2 to 16, preferably from a range of 2 to 8.

The opening 13 and/or the openings 13 can have a maximum width in the circumferential direction 12 of the friction disc, which is selected from a range of 2% to 60% of the total length of the circumference, on which the opening 13 and/or the openings 13 start, i.e. the circumference on the radially inner end face 10 in the case of the embodiment variant according to FIG. 2 and/or the circumference on the radially outer end face 14 in the case of the embodiment variant according to FIG. 3. Preferably, the maximum width of the opening 13 or the openings 13 is formed on the radially inner end face 10 in the case of the embodiment variant according to FIG. 2 and/or on the radially outer end face 14 in the case of the embodiment variant according to FIG. 3, as can be seen in FIGS. 2 and 3.

In the embodiment variant of the friction disc shown in FIG. 2, the openings 13 partially (i.e. in the end region) have a semicircular cross-sectional area which is adjoined by a square or rectangular or trapezoidal cross-sectional area in the direction of the radially inner end face 10 (as viewed in the axial direction 4). The opening 13 or the openings 13 can also have another cross-sectional shape (as viewed in the axial direction 4), for example a semicircular cross-section, as can be seen from FIG. 3.

Figure 4:
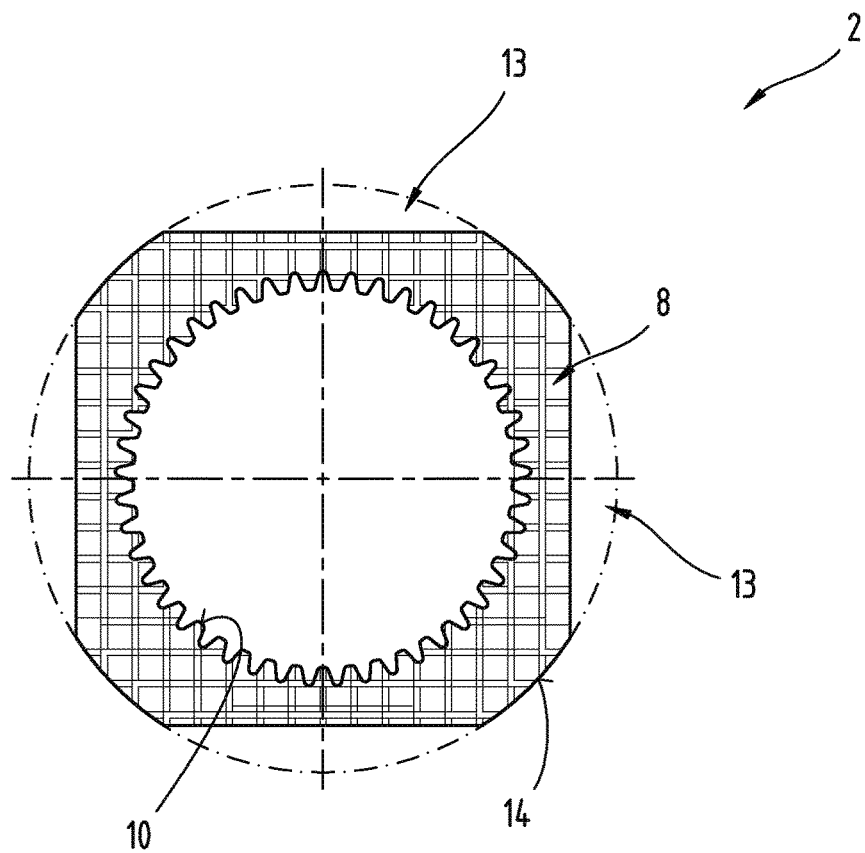
FIG. 4 shows a third embodiment variant of the friction disc.

FIG. 4 shows an embodiment variant of the friction disc in the form of an inner disc 2 having four openings 13, which are also formed to start at the outer end face 14 and extend in the direction towards the radially inner end face 10. The openings 13 have the shape of circular segments and/or arcs. As viewed in the axial direction 4 (FIG. 1), the friction disc has an approximately square shape, wherein approximately refers to the rounded edges, which represent the remainder of the original circular ring of the friction disc without openings 13. For better illustration of the openings 13, FIG. 4 shows the circle line of an opening in dashed lines, which adumbrates the original circular ring geometry without openings 13. This embodiment variant of the friction disc with the openings 13 has a geometry deviating from the circular ring geometry (as viewed from the top in the direction of the axial direction 4 (FIG. 1) onto the first or second friction lining 8).

In this embodiment variant of the friction disc, the openings 13 through the friction lining 8 are also formed to be flush with the openings 13 in the carrier ring 5 and in the preferably present second friction lining 8, such that, as in all embodiment variants of the invention, the openings 13 extend continuously through the entire friction disc in the axial direction 4.

The several openings 13 can all be designed equally as regards their size, i.e. their surface area, and the shape of their cross-sections as viewed in the axial direction 4. However, it is also possible that several openings 13 with different surface areas and/or different shapes are arranged in the friction disc.

Moreover, it is possible that the several openings 13 are formed to end at different radial heights. Furthermore, mixed variants of the arrangement of the openings 13 shown in FIGS. 2 to 4 are possible. For example, openings 13, which start at the radially inner end face 10, can be combined in one friction disc with openings 13, which start at the radially outer end face 14. The same applies to combinations of the embodiment variant according to FIG. 4 with the one according to FIG. 2 and/or FIG. 3, wherein here, the particular size of the openings represented in these figures can also differ.

FIG. 5 in excerpts shows a further embodiment variant of the friction disc, in which the edges 15 of the first and/or the second friction lining 8 are formed to be beveled where these join the at least one opening 13.

The at least one opening 13 in the first friction lining 8 and optionally also in the second friction lining 8 can extend across a radial width 16 (FIG. 2) of the first/second friction lining 8, which amounts to between 50% and 90%, in particular between 50 and 75%, of the total width of the first friction lining in the radial direction. In this regard, the radial width 16 is the measurement of the friction lining 8 between the inner circumference and the outer circumference of the friction disc 8 (without taking into account the radial width of driver elements 11, which are optionally present on the inner circumference or outer circumference).

Preferably, the first friction lining 8 and the preferably present second friction lining 8 have a grooved surface, as can be seen from FIGS. 2 to 4. The grooving can be designed in the form of a so-called waffle pattern. In particular, the grooves can have an at least approximately circle-segment-shaped cross-section. Moreover, the grooves can have a depth of between 20% and 70%, in particular between 20% and 50%, of the thickness of the respective friction lining 8 in the axial direction 4. Tangents applied to the side walls of the grooves can also be at an angle to one another selected from a range of 90° to 120°.

As compared to recesses in friction linings according to the prior art, the invention allows for the formation of larger openings without impairing the mechanical stability of the friction disc.

The arrangement of the openings 13 (FIG. 3) starting at the radially outer end face 14 for an inner disc 2 as opposed to the arrangement of the openings starting at the radially inner end face 10 (FIG. 2) has the advantage that thereby, the driver elements 11 are not interrupted. In case of an outer disc 3 the reversed design is advantageous.

The exemplary embodiments show possible embodiment variants of the friction disc, while it should be noted at this point that combinations of the individual embodiment variants are also possible.

Finally, as a matter of form, it should be noted that for ease of understanding of the structure of the friction disc, it is not obligatorily depicted to scale.

Although only a few embodiments of the present invention have been shown and described, it is to be understood that many changes and modifications may be made thereunto without departing from the spirit and scope of the invention.

LIST OF REFERENCE NUMBERS

9 disc body
1 disc pack
10 end face
2 inner discs
11 driver element
3 outer discs
12 circumferential direction
4 axial direction
13 opening
5 carrier ring
14 end face
6 surface
15 edge
7 surface
16 width
8 friction lining

What is claimed is:

1. A friction disc having a flat carrier ring which comprises a first surface and a second surface,
wherein a first annular friction lining is arranged on the first surface,
wherein the first friction lining is a scatter-sintered friction lining sintered onto the carrier ring,
wherein a first opening is formed in the first friction lining in an axial direction, which extends in the axial direction also through the carrier ring,
wherein the first opening in at least some areas of the carrier ring and the first annular friction lining has a dome-shape starting at an outer circumference of the carrier ring and becoming smaller inwardly in the radial direction;
wherein if the friction disc is an inner disc, the friction disc comprises at least one driver element on a radially inner end face, which is separate from the first opening; and
wherein if the friction disc is an outer disc, the friction disc does not have at least one driver element on the radially inner end face.

2. The friction disc according to claim 1, wherein a second friction lining is arranged on the second surface of the carrier ring, said second friction lining:
comprising a geometry deviating from a circular ring shape, wherein the carrier ring also comprises the geometry of the second friction lining that deviates from the circular ring shape, each as viewed in the axial direction, and/or
being formed with a second opening in the axial direction, which extends in the axial direction also through the carrier ring and the first friction lining, wherein the second opening is formed to start at the outer circumference of the carrier ring.

3. The friction disc according to claim 2, wherein the second friction lining is a scatter-sintered friction lining.

4. The friction disc according to claim 2, wherein the second opening in the second friction lining extends across a radial width of the second friction lining, which amounts to between 50% and 90% of the total width of the second friction lining in the radial direction.

5. The friction disc according to claim 2, wherein the edges of the first and/or the second friction lining are formed to be beveled where the edges join the first opening.

6. The friction disc according to claim 1, wherein several first openings extending through the friction disc in the axial direction are formed.

7. The friction disc according to claim 1, wherein the first opening in the first friction lining extends across a radial width of the first friction lining, which amounts to between 50% and 90% of the total width of the first friction lining in the radial direction.

\* \* \* \* \*